March 30, 1948. R. G. PIETY 2,438,518
CIRCUIT FOR MEASURING VOLTAGE OF AN ALTERNATING SOURCE
Filed July 25, 1944 3 Sheets-Sheet 1

INVENTOR.
Raymond G. Piety
BY Darby & Darby
Attys.

March 30, 1948. R. G. PIETY 2,438,518
CIRCUIT FOR MEASURING VOLTAGE OF AN ALTERNATING SOURCE
Filed July 25, 1944 3 Sheets-Sheet 2
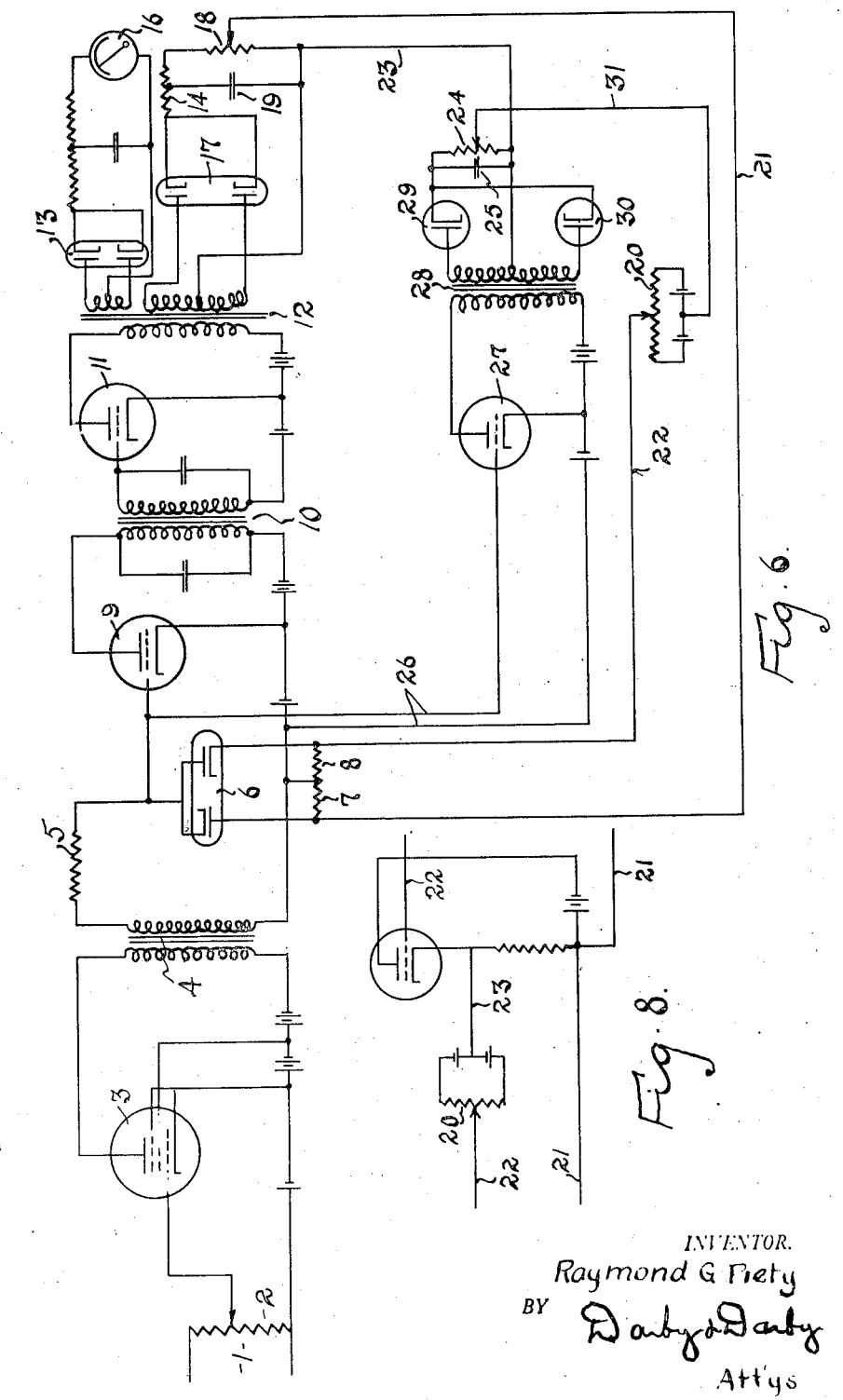
Fig. 6.
Fig. 8.
INVENTOR.
Raymond G. Piety
BY 
Att'ys Patented Mar. 30, 1948

2,438,518

UNITED STATES PATENT OFFICE 2,438,518

CIRCUIT FOR MEASURING VOLTAGE OF AN ALTERNATING SOURCE

Raymond G. Piety, Yonkers, N. Y., assignor to Phillips Petroleum Company, a corporation of Delaware Application July 25, 1944, Serial No. 546,570

6 Claims. (Cl. 171—95)

This invention relates to an improvement in method and apparatus for use in logging while drilling oil wells by measuring the small surface potentials which are used to determine the bore hole resistivity.

The subject matter of this invention relates to the type of logging while drilling a bore hole by apparatus and methods of which the disclosure in my copending application Serial No. 398,353, filed June 16, 1941 for Well surveying device, now abandoned, is an example.

The general object of this invention is to eliminate the effect of the interfering ground currents which are set up by the drilling operations from influencing the measurement of the small currents flowing at the surface as determined by the ground resistivity at the bit.

The basic idea of this invention comprises an apparatus for amplifying the ground currents produced in such methods with a wide band amplifier, passing the amplified signal through a network to produce one or more derivatives thereof, passing the signal through a clipping circuit to suppress all voltages higher than a desired amount, and controlling the clipping level of the clipping circuit by the output current of the measuring system.

The invention also includes the method of accomplishing this result.

This invention resides substantially in the combination, construction, arrangement, steps and series of steps, all as will be described in detail below.

In the accompanying drawings,

Figure 6 is a similar view of a modified circuit in which the clipping circuit is controlled by a current composed of the output measuring voltage and the output voltage after clipping;

Figure 8 diagrammatically illustrates a circuit which may be introduced into the cathode drive circuit for the clipper, as will be explained later.

Figure 1:
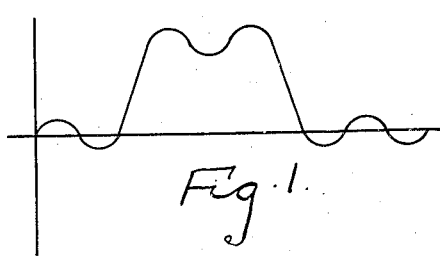
Figure 1 is a graphic illustration of a low frequency sinusoidal signal current of the type used in logging a well while boring but as modified by an interfering current of trapezoidal wave form.

In the method of logging an oil well bore while drilling it as disclosed for example in my copending application, a vibrator inverter is used to generate low frequency alternating current. This low frequency current is employed to cause a potential drop between the surface casing and a grounded electrode at some distance from the surface casing. During the running in of the drill pipe and also during drilling operations, the drill pipe, derrick and associated equipment have many metallic surfaces which make or break contact with each other. This leads to a variation in the circulating ground currents which flow between the different grounded metal parts of the drilling equipment. These currents flow because the various components of the drilling rig such as derrick, surface casing, drill pipe, mud pipe, mud and water lines, and the like, are of different metals and are grounded at points where the composition of the soil differs. The net result is that during operations on the drilling rig an interfering voltage is introduced into the amplifiers measuring the logging current circulating in the earth's surface. This interference takes the form of a series of rectangular pulses as if a direct current were being switched on and off.

The usual method of reducing interference where a single sinusoidal voltage is being measured is to introduce sharply tuned circuits to filter out all components not of the frequency of the sinusoidal voltage. This invention discloses a method of reducing this type of interference and greatly improves upon the action of tuned circuits. The basic idea of this invention is to amplify the input voltage, that is the voltage of the ground currents, with a wide band amplifier, passing the amplified current through a circuit to produce one or more derivatives of the signal, passing the derived current through a clipping circuit which suppresses all voltages higher than a controlled value, and controlling the clipping level voltage of the clipping circuit by the output voltage of the current in the measuring system.

In accordance with this invention there are disclosed several methods of automatically controlling the clipping level voltage of the clipping circuit. The controlling voltage for the clipping circuit, in one form of the invention may be made proportional to the average value of some suitable function of the voltage of the output current in the measuring circuit. This average is taken over a time interval long compared to a single cycle, but short compared with the variations naturally occurring in the signal voltage. A simple way to control the clipping voltage is to amplify the output of the clipping circuit by a tuned amplifier, impress this output on a rectifier which has a voltage output proportional to the average value of the signal, and apply a portion of the rectified output to bias the clipping circuit so that this circuit will just begin to clip the peaks of a purely sinusoidal input current.

If the signal is variable in frequency so that tuning is undesirable, then advantage can be taken of the fact that the interference is more sharply peaked than the signal by giving less weight in the averaging process to the higher voltages. For instance, the output of a linear rectifier can be impressed on the grid of a vacuum tube which has a decreasing voltage gain as its grid voltage increases. The resultant voltage can be averaged and applied to an amplifier with an inverse characteristic so that the relation between a sinusoidal input and the control voltage on the clipping circuit is approximately linear. The advantage of this operation is apparent when it is noted that the voltage which controls the clipping circuit is composed of both signal and interference so that in the limit, when the signal is zero, the clipping voltage would not go to zero. However, the interference will produce less output when averaged in this manner because of its impulsive form than with ordinary averaging systems.

It is not necessary that the clipping voltage be proportional to the output since a constant voltage may be used to bias the clipping circuit.

A second but somewhat more complicated method of controlling the clipping voltage can be obtained in accordance with this invention which will operate better at higher levels of interference. In this case the controlling action is obtained by generating a voltage P proportional to the peak value of the output of the clipping circuit and a second voltage A, either before or preferably after tuning proportional to the average of the absolute value of the output of the clipping circuit. This averaging is obtained by the sharply tuned transformer 10 in Figures 6 and 7 and the time constants determined by the elements 14, 18 and 19 of the rectifier circuit. Let the proportional voltage on the clipping circuit be proportional to $A-(P-A)k$ where $P>A$ always and $k$ is the factor by which the difference between the peak voltage from the clipping circuit and the average voltage is amplified. Now if $k$ is large it is obvious that a degenerative action is set up so that $P-A$ approaches smaller values as $k$ increases. In adjusting a circuit of this type, a sinusoidal input without interference would cause a voltage to be generated by rectifier 17, which would open the gate represented by diode 6 to a voltage K times the signal at this point, however, rectifiers 29 and 30 would generate a closing voltage K—1 times the signal, thus leaving the gate with a proper opening to pass the signal. This makes it possible to clip at a voltage level just above the signal level.

A third method in accordance with this invention of reducing interference of this kind is to employ the input to the clipping circuit to generate a voltage which causes the clipping circuit to reduce the voltage passing through it to a very small value whenever the input signal exceeds a certain level. This level itself can be manually set up, or automatically controlled in the same manner as in the first and second methods above. This type of action is possible when the duration of the interfering impulse is short, so that completely cutting off the signal for a short period does not represent a large disturbance.

It may be noted that there is a similarity between the clipping action here proposed and some of the noise silencer methods used in radio reception. In the case of a radio communication signal the carrier level is used to control the clipping circuit so that either the signal is completely suppressed and the interference is present or the amplitude is limited to a fixed value depending upon the carrier strength. It should be noted, however, that the methods applicable to high frequency signals such as are used in radio communication, are only applicable to the low frequency signals, such as considered here, when the interference is unusually impulsive in nature, that is of high amplitude and short duration. When the interference consists of rectangular pulses which may be of long duration, the above method is much inferior to the methods disclosed herein, where by differentiating the input signal one or more times, then clipping it, and if desired integrating or tuning it, a very considerable improvement can be obtained in many cases.

Figure 3:
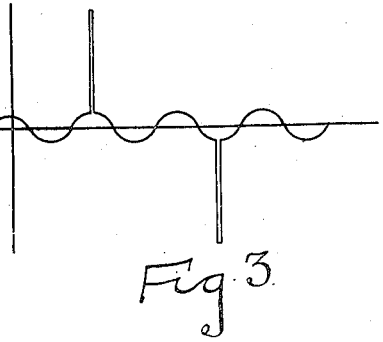
Figure 3 is the graph of a derivative of the original signal.
Figure 2:
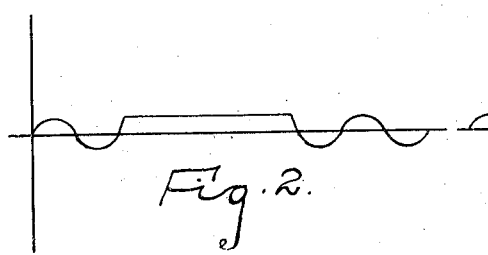
Figure 2 is a graph of this signal after passing it through a clipping circuit which cuts off the voltage peaks thereof above the average peak voltage of the signal.
Figure 4:
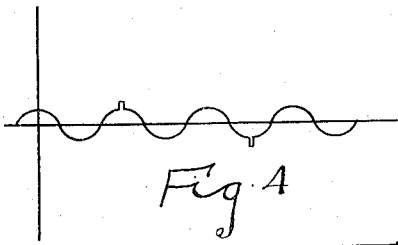
Figure 4 is a graph of the original signal after passing through the clipping circuit.

In Figure 1 there is shown a sinusoidal signal as modified by an interfering voltage of trapezoidal wave form. If this voltage is passed through a circuit which cuts off the portion above the average peak voltage of the signal as illustrated in Figure 2, the signal itself will be suppressed for a period. However, if the total voltage is differentiated and then clipped, as illustrated in Figures 3 and 4, it can on subsequent integration, if necessary, be restored to its original frequency characteristics, so that a substantial reduction in interference can be obtained without completely suppressing the signal for nearly so long an interval.

If we consider the frequency spectrum of a transient pulse as given by its Fourier transform and compare it with the spectrum of its derivative it will be found that in the complex variable notation of electric circuit theory, the transform for the derivative is just $j\omega$ times the transform for the pulse. Where $\omega = 2\pi x$ frequency and $j=\sqrt{-1}$. This fact brings out the importance of using a wide band amplifier before clipping, as it is desirable to pass several octaves above the signal frequency. If the high frequencies are attenuated before they reach the input of the amplifier it is desirable to introduce an equalizing circuit to improve the action of this limiting system. In order to obtain a further gain by taking higher derivatives it is even more essential that the higher frequencies be amplified.

In the particular case of the application of this invention to logging while drilling the signal frequency is about ten cycles so that the frequency requirements are easily met. This invention is also well adapted to electrical prospecting for oil where low signal frequencies are generally desirable. This invention is generally useful when the derivative of the interference is large compared to the signal, and when the low frequency components after taking the derivative, are small compared to the signal. This is a condition which often prevails in practice.

To illustrate the advantages of taking a derivative let us consider a voltage E represented by the following equation:

$$E = \tfrac{1}{2} \sin 19t + \sin 62.8t + \tfrac{1}{2} \sin 628t$$

where the second term represents a 10 cycle signal in the presence of ½ the signal amplitude of 3 cycle and 100 cycle interference. The derivative of E is $$\frac{dE}{dt} = 19/2 \cos 19t + 62.8 \cos 62.8t + 314 \cos 628t$$

The high frequency interference which was only ½ a signal is now five times the signal while the low frequency interference is a little less than ⅛ the signal. If the clipping voltage is set to cut off all voltages higher than 62.8+9.5=72.3 volts then the top 314−72.3=241.7 volts of the interference on the high side will be cut off. Thus the effect of taking a derivative before clipping relatively reduces the low frequency component so that the clipping voltage may be more nearly equal to the signal and increases the high frequency component so that a larger benefit can be obtained by clipping. This is an artificial case chosen for its simplicity. However, it is clear that an extension to impulsive transient interference will show a similar advantage.

Figure 5:
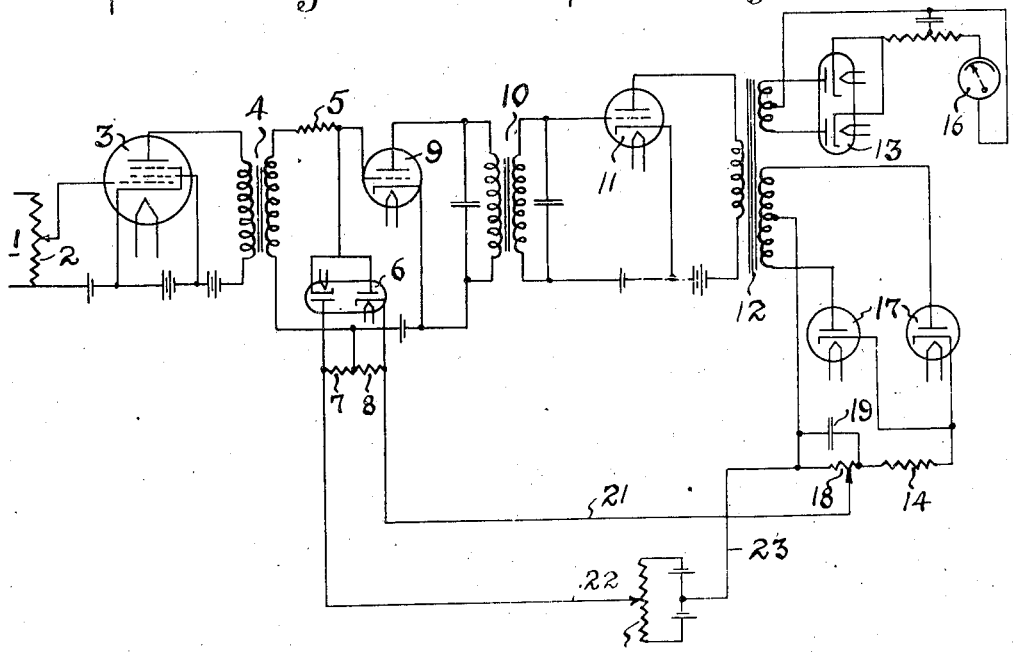
Figure 5 is a schematic and diagrammatic illustration of a circuit in accordance with this invention in which the average value of the measuring voltage determines the value of the clipping voltage.

In the system of Figure 5 the input current is supplied through the circuit 1 from the grounded terminals, as previously explained properly adjusted in magnitude by the potentiometer 2, to the input of a pentode 3. The output of the pentode is coupled through a transformer 4 to the input circuit of the triode 9, forming part of the clipping circuit. Included in this input circuit is resistor 5 and across the input circuit is a full wave rectifier, comprising a pair of diodes 6 shunted by a resistor comprising the portions 7 and 8. The output circuit of triode 9 is coupled through a tuned transformer 10 to the input circuit of an amplifying triode 11. The output circuit of this triode is connected to the primary of a three-winding transformer 12. One secondary of this winding is connected through a full wave rectifier, comprising a pair of diodes 13 and a suitable operating circuit, to the measuring voltmeter 16. This portion of the circuit is well known in the art and no further reference thereto is necessary. The other secondary is connected through a full wave rectifier, including a pair of diodes 17, to a pair of resistors 14 and 18 in series. The resistor 18 is shunted by a capacitor 19. Resistor 18 is of the potentiometer form having its movable contact connected by the wire 21 to one end of resistor 7—8. Another lead from the output of the full wave rectifier 17 is connected by wire 23 to a potentiometer 20, the movable contact of which is connected to the other end of the resistor 7—8. Various batteries illustrated in the different circuits are provided for the usual purpose of providing operating potentials for circuits of this type. The current supplies for the heaters of the cathodes of the various vacuum tubes have been omitted for sake of simplicity.

The operation of this circuit will now be described. Generally speaking the circuit of Figure 5 is connected so that the average value of the output voltage thereof determines the voltage level in the clipping circuit at which the signal is cut off. In other words, it determines the level at which the voltage peaks of the signal voltage will be cut off. The input voltage is impressed upon the pentode 3. The transformer 4 in the plate circuit of pentode 3 has a primary inductance which has a small reactance compared to the plate resistance of pentode 3, so that the plate current-grid voltage relation for pentode 3 is independent of the frequency for frequencies high compared to the signal frequencies. If the load on the secondary of transformer 4, which is composed principally of the resistance of resistor 5 plus the distributed capacity of the secondary, has a high impedance compared to the secondary inductance, then the voltage across the secondary terminals will be $$M \frac{di}{dt}$$

where M is the mutual inductance between the primary and secondary of transformer 4, and $i$ is the current in the primary. Under the above conditions the secondary voltage will be substantially equal to the derivative of the input voltage. The pair of diode rectifiers 6 are non-conducting when the peak secondary voltage is less than the direct voltage drop across resistor 7—8, so that very little current flows through resistor 5. When the secondary voltage exceeds the voltage drop across the resistor 7—8 either one or the other of the diode 6 will conduct current according to the sign of the secondary voltage. The resistance of resistor 7—8 plus the diode resistance, when conducting, is small compared to the resistance of resistor 5, so that practically the entire secondary voltage appears across resistor 5 instead of across the input of the pentode 3. The signal is thus passed through to the triode 9 for amplification up to a predetermined voltage level and is cut off above that level. The clipped signal after amplification by triode 9 passes through the tuned transformer 10 which is tuned to the signal frequency, and applied to the input of the amplifying triode 11. The amplified signal is applied to the transformer 12. A portion of that signal is rectified in diodes 13, filtered, and applied to the meter 16 for the usual purposes. The portion of the current flowing in the other secondary is applied to the rectifying device 17, and rectified current flows through the current limiting resistor 14, thereby limiting the charging current into capacitor 19, so that the voltage across this capacitor is proportional to the average voltage on the rectifier. This voltage is proportioned by means of the potentiometer 18 and applied across the resistor 7—8. The other leg of this circuit comprising the wires 22 and 23 includes a potentiometer 20 and biasing batteries to permit, by the adjustment of the potentiometers 18 and 20, the application of a voltage to the clipping circuit of such a value that clipping action just starts when the signal without interference is applied to the input thereof. Potentiometer 20 is adjusted for the purpose of compensating for the slight conductivity of the diodes at zero voltages. A minimum number of circuit elements have been disclosed in order to keep the disclosure as simple as possible, it being understood that additional stages of amplification, as well as other refinements, may be employed when desired. The values of the components of this circuit are determined according to standard design procedure, and obviously depend in part on the frequency of the signal.

Similar parts of the circuit of Figure 6 have been given the same reference numerals. Only the differences need to be described. In this arrangement the output of the clipping circuit is applied by means of the leads 26 to the input of a triode in the output circuit of which is a transformer 28. Connected in the secondary of this transformer is a full wave rectifier including the pair of diodes 29 and 30. Rectified current is applied to the network comprising the resistor 24, shunted by the capacitor 25. One end of the network 19—18 is connected to one end of the network 25—24 as shown, by the wire 23, and movable tap of potentiometer 24 is connected by wire 31 through the biased potentiometer 20 and wire 22 to one end of the resistor 7—8 as before, having its other end connected to the movable tap of potentiometer 18 by wire 21.

The operation of this circuit is essentially the same as the circuit of Figure 5 except for the addition of the amplifier 27 and the rectifier including the diodes 29 and 30. The triode 27 amplifies the signal after clipping and before tuning, which amplified signal portion is rectified. The rectifier current is applied to the capacitor 25 across the terminals of which appears a voltage substantially equal to the peak voltage of the secondary of transformer 28. A portion of the output of this rectifier as determined by the position of the tap on potentiometer 24 is connected, as shown, to oppose the voltage generated across resistor 18. If the voltage on resistor 7 is $2k$ times the peak voltage $P$ which is applied to pentode 3, then the tap on potentiometer 18 is set to give $2(A+kA)$ volts where $2A$ is the signal, without interference, required to just clip a sine wave signal. The factor 2 appears because the voltage is divided across resistors 7—8. The clipping voltage will then be $A-k(P-A)$. When a pure sine wave is applied to the circuit $P=A$ and clipping is at a correct value. If there are impulsive peaks occurring at frequent intervals, the output of the rectifier 29—30 will suppress the clipping voltage so that $P-A$ tends to a small value. This circuit is particularly adapted to situations where interference is created by the operation of machinery so that periodic pulses of constant amplitude predominate when the machines are turned on.

Figure 7:
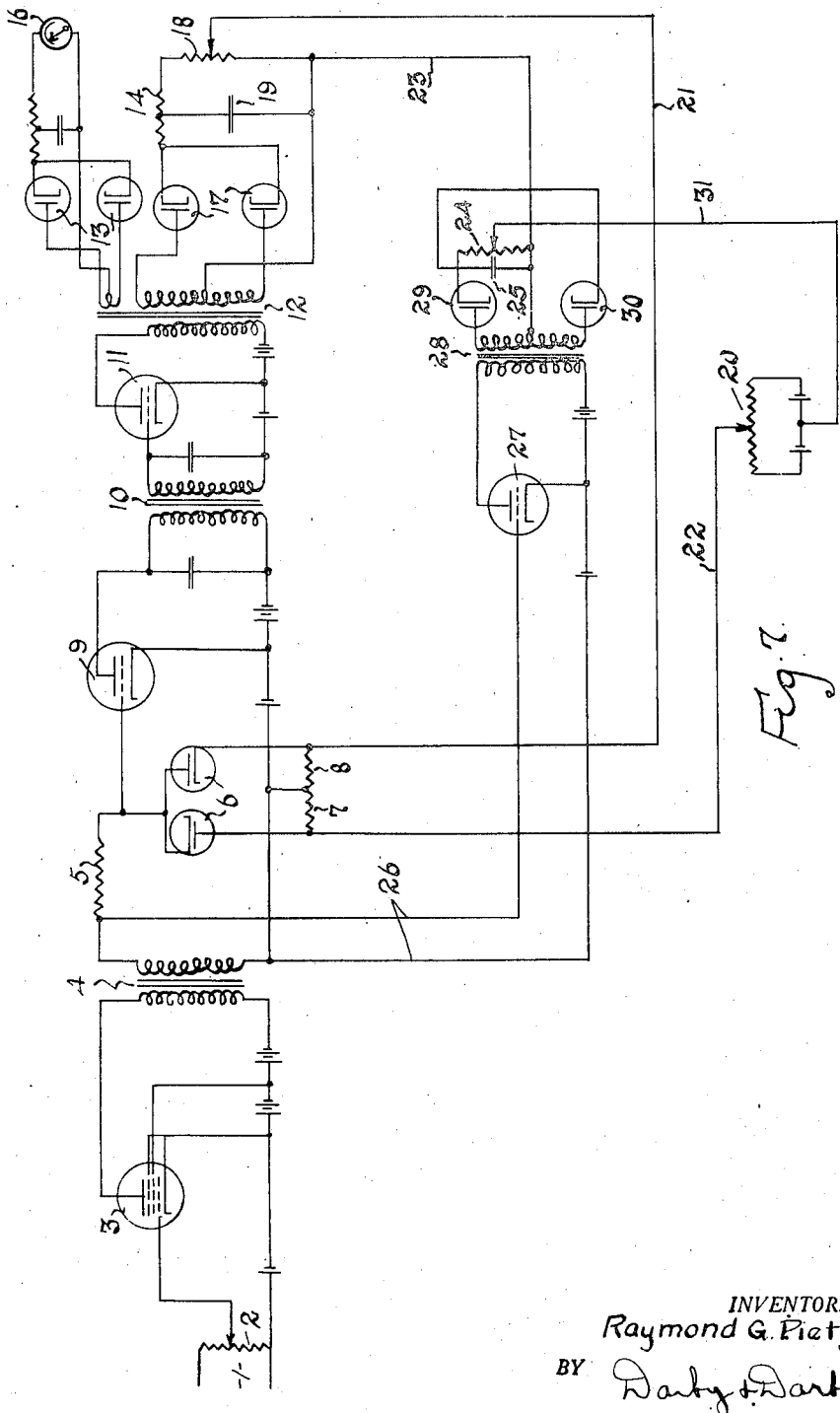
Figure 7 is a similar view of a modification in which the clipping circuit is controlled by a combination voltage composed of the output measuring voltage and a derivative prior to clipping.

The circuit of Figure 7 is quite similar to that of Figure 6, with the exception that the input circuit wires 26 for the triode amplifier 27 are connected directly across the secondary of transformer 4, that is in circuit prior to clipping. In other words, the driving voltage for the triode 27 is that of the secondary of transformer 4. The voltage across resistor 24 tends to lower the voltage at which the signal is clipped. At high interference levels the voltage across resistor 24 will completely suppress the signal for the duration of the interference, and in this respect differs in operation from the circuit of Figure 6.

In each of the circuits of Figures 5, 6 and 7 the cathode drive circuit of Figure 8 may be inserted in the leads 21, 22 as indicated by the reference numeral. This arrangement merely reduces the amount of power required to drive the rectifiers since in this case they are essentially feeding an open circuit.

The arrangements herein disclosed show circuits which take a single derivative before clipping, but it is obvious that additional stages satisfying the conditions of the first stage shown may be added in cascade to give higher order derivatives when required.

Generally it will be seen that the core of the invention herein disclosed is that of taking one or more derivatives of a single current, limiting the highest voltage amplified to a controlled value and controlling the magnitude of the highest voltage amplified by some suitable average of the output signal or by combining this average with the peak value of the signal as described above. The use of tuning at the transformer 10 is optional but removal of the high frequency components before limiting will reduce the usefulness of this invention.

From the above description it will be apparent to those skilled in the art that the subject matter of this invention is capable of variations in details in accordance with established practice, and I do not, therefore, desire to be strictly limited by the disclosure given herein for illustrative purposes, but rather by the scope of the appended claims.

What is claimed is:

1. In an electrical circuit for measuring the voltage of an alternating signal current having interference voltage components, comprising a source of such alternating signal current, means fed thereby for amplifying said signal current, means for producing a derived current therefrom, clipping means for suppressing the interference voltage peaks of said derived signal current, means connected thereto and tuned to the frequency of said signal current, means for rectifying the output of said tuned means, means for measuring the average value of said rectified current, means for applying said rectified current to said clipping means to control the clipping level thereof, a full wave rectifier fed by said clipping means, and means for applying a portion of said last rectified current to said clipping means so that its voltage is in opposition to the voltage applied to the clipping means from said first rectifier.

2. A tuned electrical circuit for measuring the potentials of alternating signal currents containing interference components comprising a source of alternating signal potential to be measured, means fed thereby for generating a derivative of the potential therefrom, a signal transmitting tuned network, potential limiting means for transmitting the derivative of the potential only for values below the maximum determined by the signal transmitted through said network, and means for indicating the magnitude of the transmitted resultant output potential.

3. A tuned electrical circuit for measuring the potentials of alternating signal currents containing interference components comprising a source of alternating signal potential to be measured, means fed thereby for taking a derivative of the potential therefrom, potential limiting means for transmitting the derivative of the potential only for values below a maximum determined by the average value of the transmitting signal, and means for indicating the magnitude of the transmitted resultant output potential.

4. In the combination of claim 2, means for controlling said potential limiting means by the difference between the tuned and untuned signal current passed by said potential limiting means.

5. In the combination of claim 3, said potential limiting means being controlled by the difference between the average signal potential over a time interval corresponding to several cycles and the average signal potential for a time interval not exceeding that of a single cycle.

6. In the combination of claim 2, said potential limiting means being controlled by the difference between an untuned current derived from the alternating signal current prior to limiting, and a tuned current derived from the alternating signal current subsequent to limiting.

RAYMOND G. PIETY.

REFERENCES CITED

The following references are of record in the file of this patent:

UNITED STATES PATENTS

| Number | Name | Date |
|---|---|---|
| 2,144,995 | Pulvari-Pulvermacher | Jan. 24, 1939 |
| 2,276,565 | Crosby | Mar. 17, 1942 |
| 2,329,558 | Scherbatskay | Sept. 14, 1943 |